(12) United States Patent
Katakura

(10) Patent No.: US 6,881,169 B2
(45) Date of Patent: Apr. 19, 2005

(54) TRANSMISSION WITH AUTOMATIC CLUTCH

(75) Inventor: Takeji Katakura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/246,635

(22) Filed: Sep. 19, 2002

(65) Prior Publication Data

US 2003/0056612 A1 Mar. 27, 2003

(30) Foreign Application Priority Data

Sep. 25, 2001 (JP) ........................................ 2001-290580

(51) Int. Cl.⁷ ................................................. B60K 1/02
(52) U.S. Cl. .............................. 477/3; 74/335; 74/337; 74/661; 74/665 B; 180/65.2
(58) Field of Search ......................... 74/335, 337, 661, 74/665 B; 477/3; 180/65.2

(56) References Cited

U.S. PATENT DOCUMENTS

| | | | | |
|---|---|---|---|---|
| 5,603,242 A | * | 2/1997 | Krieger ........................ | 74/335 |
| 6,269,895 B1 | * | 8/2001 | Tanuguchi et al. .......... | 180/65.2 |
| 6,377,883 B1 | * | 4/2002 | Shimabukuro et al. ....... | 701/51 |
| 6,389,916 B1 | * | 5/2002 | Fukuda ........................ | 74/335 |
| 6,502,474 B1 | * | 1/2003 | Sakamoto et al. ............ | 74/325 |
| 6,506,139 B1 | * | 1/2003 | Hirt et al. ....................... | 477/3 |
| 6,514,173 B1 | * | 2/2003 | Suzuki ........................ | 477/124 |
| 6,533,701 B1 | * | 3/2003 | Maruyama ..................... | 477/5 |
| 6,565,479 B1 | * | 5/2003 | Fattic et al. ................... | 477/3 |
| 2002/0177504 A1 | * | 11/2002 | Pels et al. ....................... | 477/3 |
| 2003/0045389 A1 | * | 3/2003 | Kima ............................ | 475/5 |

FOREIGN PATENT DOCUMENTS

| | | |
|---|---|---|
| JP | 61-45163 A | 3/1986 |
| JP | 63-2735 A | 1/1988 |
| JP | 11-26449 A | 1/1999 |
| JP | 11-141665 | 5/1999 |
| JP | 2001-196493 A | 7/2001 |
| JP | 2001-234989 A | 8/2001 |
| JP | 2001-289289 A | 10/2001 |

* cited by examiner

Primary Examiner—Rodney H. Bonck
Assistant Examiner—David D. Le
(74) Attorney, Agent, or Firm—Foley & Lardner LLP

(57) ABSTRACT

A transmission with an automatic clutch is arranged to execute a shift operation by disconnecting a transmission input shaft from an output shaft of a power source and operating one of coupling sleeves so as to establish a desired transmission ratio. The transmission is comprised of a bypass driveline. During this shift operation, the bypass driveline becomes operative and transmits a power of the power source to a transmission input shaft while bypassing the automatic clutch.

10 Claims, 4 Drawing Sheets

TRANSMISSION WITH AUTOMATIC CLUTCH

BACKGROUND OF THE INVENTION

The present invention relates to an automatic-clutch type transmission which is arranged to automatically disengage a clutch between an engine and a transmission when a shift operation is executed.

Japanese Patent Provisional Publication No. 11-141665 discloses an automatic-clutch type transmission which is arranged to apply an assist power from a motor to a transmission output shaft during shifting, in order to prevent a shift shock during the shifting.

SUMMARY OF THE INVENTION

However, such an assisting operation by a motor requires that the motor performs a high-torque and high-power motor so as to achieve such assisting operation throughout a whole range from a low-speed gear ratio to a high-speed gear ratio.

It is therefore an object of the present invention to provide an automatic-clutch type transmission which is arranged to execute an assisting operation during shifting mainly by means of an internal combustion engine without affecting a shift operation of the transmission.

An aspect of the present invention resides in a transmission comprising: a transmission input shaft; an input gear set attached to the transmission input shaft; a transmission output shaft; an output gear set attached to the transmission output shaft; a plurality of coupling sleeves one of which selectively fixes one gear of the input gear set and the output gear set to one of the transmission input shaft and the transmission output shaft so as to establish a desired transmission ratio between the transmission input shaft and the transmission output shaft; an automatic clutch that is selectively put in one of an engaged state for connecting the transmission input shaft with an output shaft of a power source and an disengaged state for disconnecting the transmission input shaft from the output shaft of the power source to execute a shift operation of the transmission; and a bypass driveline that transmits a power of the power source to the transmission output shaft while bypassing the automatic clutch when the automatic clutch is put in the disengaged state.

Another aspect of the present invention resides in a transmission with an automatic clutch, comprising: a main driveline that receives a power of a power source through an automatic clutch and a transmission input shaft to a transmission output shaft; and a bypass driveline that transmits the power of the power source to the transmission output shaft while bypassing the automatic clutch when the automatic clutch is disengaged.

A further another aspect of the present invention resides in a shift control system of a transmission with an automatic clutch, comprising: a controller determining whether a shift command is generated, the controller commanding the transmission to transmit a power of a power source through a bypass driveline to an output shaft of the transmission when the shift command is generated.

A further another aspect of the present invention resides in a shift control system comprising: a transmission comprising, a transmission input shaft, an input gear set attached to the transmission input shaft, a transmission output shaft parallel with the transmission input shaft, an output gear set attached to the transmission output shaft, the output gear set being selectively engaged with the input gear set, a coupling mechanism set that selectively fix one gear of the input gear set and the output gear set to one of the transmission input shaft and the transmission output shaft in response to a shift control signal, an automatic clutch that is selectively put in one of an engaged state for connecting the transmission input shaft with an output shaft of a power source and an disengaged state for disconnecting the transmission input shaft from the output shaft of the power source, a bypass power-transmission line selectively put in a connecting state for transmitting a power of the power source to the transmission output shaft through the bypass power-transmission line while bypassing the automatic transmission and a disconnecting state for canceling the power of the power source to the transmission output shaft through the bypass power-transmission line; and a controller outputting the shift control signal to the transmission to establish a desired transmission ratio of the transmission, the controller putting the automatic clutch in the disengaged state during an operation of the coupling mechanism set, the controller putting the bypass power-transmission line in the connecting state during when the automatic clutch is put in the disengaged state.

Further, according to the present invention, a method of executing a shift control of a transmission with an automatic clutch, comprising: determining whether a shift operation is being executed; and commanding the transmission to transmit a power of a power source through a bypass driveline to an output shaft of the transmission when the shift operation is being executed.

The other objects and features of this invention will become understood from the following description with reference to the accompanying drawings.

DETAILED DESCRIPTION OF THE INVENTION

Referring to FIGS. 1 through 5, there is shown an embodiment of a transmission 50 with an automatic clutch 4 in accordance with the present invention.

Figure 1:
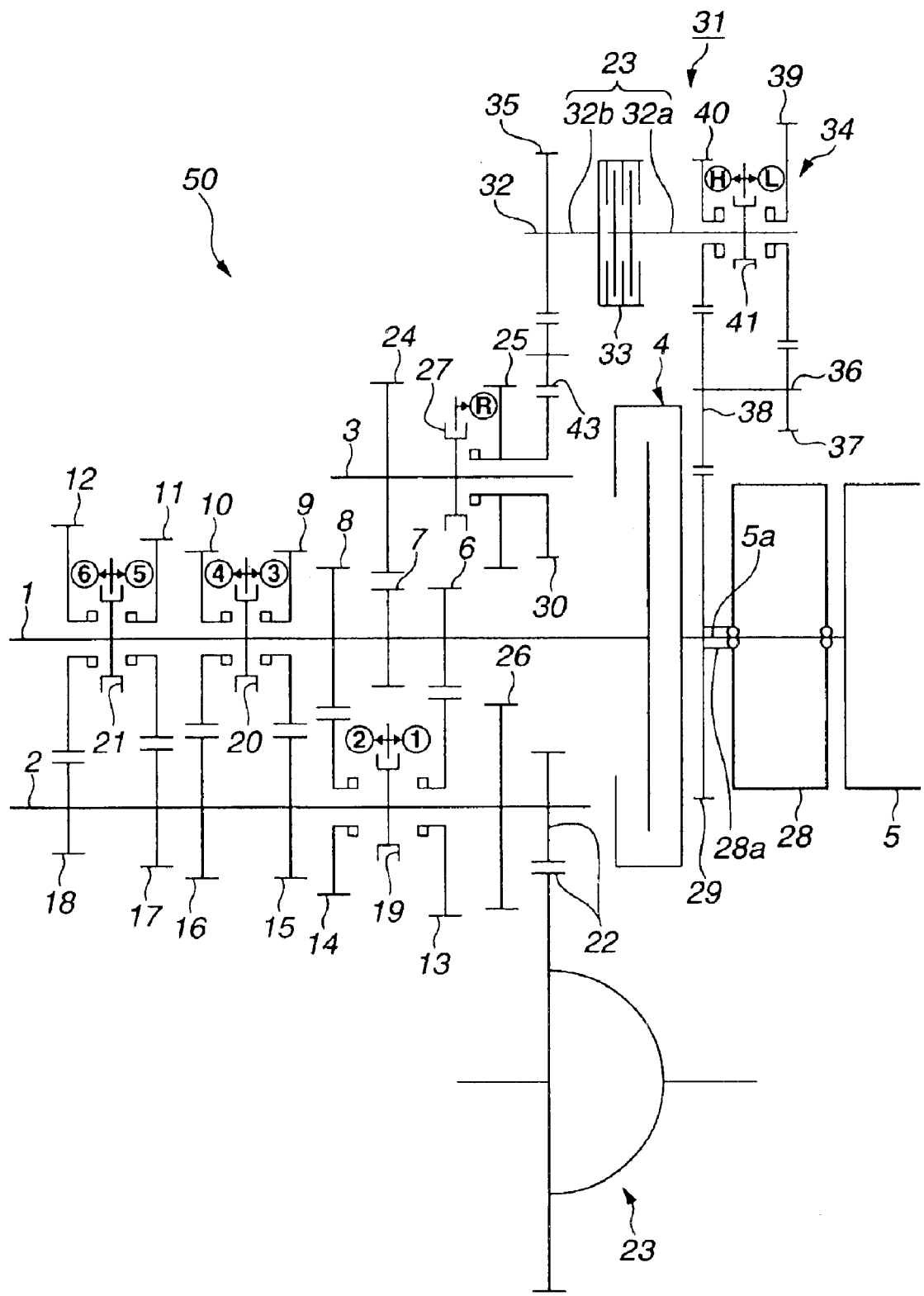
FIG. 1 is a skeleton diagram showing a transmission with an automatic clutch of an embodiment according to the present invention.
Figure 2:
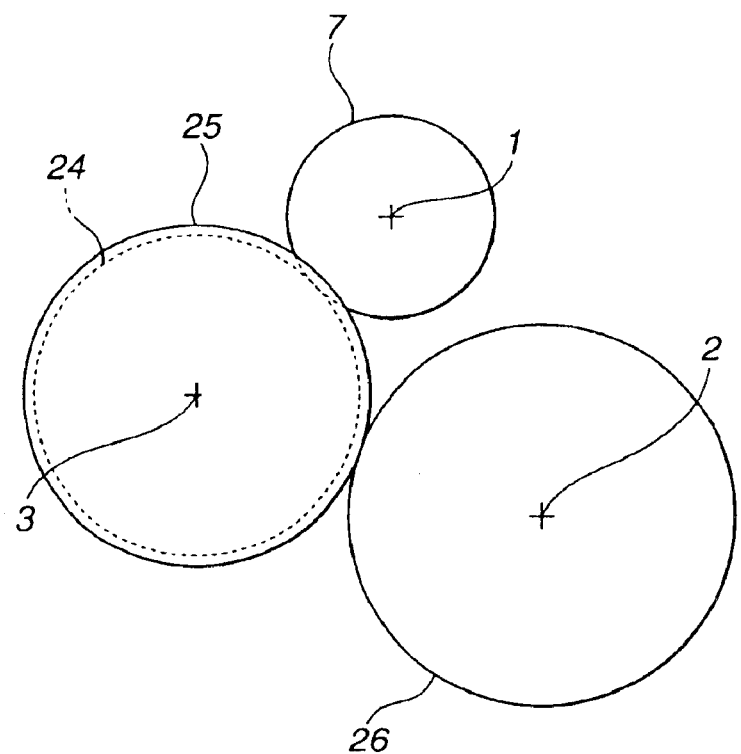
FIG. 2 is an explanatory view showing a positional relationship among an input shaft, an output shaft and an idler shaft of the transmission of FIG. 1.

Transmission 50 is of an automatic-clutch type transmission applied to a vehicle. Transmission 50 comprises an input shaft 1, an output shaft, an idler shaft 3, an input gear set and an output gear set. Input shaft 1, output shaft and idler shaft 3 are arranged in parallel. Although FIG. 1 shows that input, output and idler shafts 1, 2 and 3 are arranged on one plane in order to simply represent the elements of the transmission system, they are practically arranged with the positional relationship shown in FIG. 2.

A first-speed input gear 6, a reverse input gear 7 and a second-speed input gear 8 of the input gear set are fixedly connected to input shaft 1 so as to locate at a side of input shaft 1 which is connected and disconnected with a crankshaft 5a of an internal combustion engine 5 through an automatic clutch 4 in the order of mention. Further, a third-speed input gear 9, a fourth-speed input gear 10, a fifth-speed input gear 11 and a sixth-speed input gear 12 of the input gear set are rotatably connected to input shaft 1.

A first-speed output gear 13 and a second-speed output gear 14 are rotatably connected to output shaft 2. First-speed output gear 13 is meshed with first-speed input gear 6, and second-speed output gear 14 is meshed with second-speed input gear 8. Further, a third-speed output gear 15, a fourth-speed output gear 16, a fifth-speed output gear 17 and sixth-speed output gear 18 of the output gear set, which are meshed respectively with third-speed input gear 9, fourth-speed input gear 10, fifth-speed input gear 11 and sixth-speed output gear 12, are fixedly connected to output shaft 2.

A first synchromesh mechanism is attached to output shaft 2 between first-speed output gear 13 and second-speed output gear 14 of the output gear set. When a coupling sleeve 19 of the first synchromesh mechanism is slid from a neutral position shown in FIG. 1 toward the right-hand side, first-speed output gear 13 is fixedly connected to output shaft 2 to produce a first-speed selected condition, so that the rotation of input shaft 1 is transmitted to output shaft 2 through first-speed input gear 6 and first-speed output gear 13. When coupling sleeve 19 is slid from the neutral position shown in FIG. 1 toward the left-hand side, second-speed output gear 14 is fixedly connected to output shaft 2 to produce a second-speed selected condition, so that the rotation of input shaft 1 is transmitted to output shaft 2 through second-speed input gear 8 and second speed output gear 14.

Furthermore, a second synchromesh mechanism is attached to input shaft 1 between third-speed input gear 9 and fourth-speed input gear 10. When a coupling sleeve 20 of the second synchromesh mechanism is slid from a neutral position shown in FIG. 1 toward the right-hand side, third-speed input gear 9 is fixedly connected to input shaft 2 to produce a third-speed selected condition, so that the rotation of input shaft 1 is transmitted to output shaft 2 through third-speed input gear 9 and third-speed output gear 15. When coupling sleeve 20 is slid from the neutral position shown in FIG. 1 toward the left-hand side, fourth-speed input gear 10 is fixedly connected to input shaft 2 to produce a fourth-speed selected condition, so that the rotation of input shaft 1 is transmitted to output shaft 2 through fourth-speed input gear 10 and fourth-speed output gear 16.

Furthermore, a third synchromesh mechanism is attached to input shaft 1 between fifth-speed input gear 11 and sixth-speed input gear 12. When a coupling sleeve 21 of the third synchromesh mechanism is slid from a neutral position shown in FIG. 1 toward the right-hand side, fifth-speed input gear 13 is fixedly connected to input shaft 1 to produce a fifth-speed selected condition so that the rotation of input shaft 1 is transmitted to output shaft 2 through fifth-speed input gear 11 and fifth-speed output gear 17. When coupling sleeve 21 is slid from the neutral position shown in FIG. 1 toward the left-hand side, sixth-speed input gear 12 is fixedly connected to input shaft 1 to produce a sixth-speed selected condition, so that the rotation of input shaft 1 is transmitted to output shaft 2 through sixth-speed input gear 12 and sixth-speed output gear 18.

The rotation of output shaft 2 is inputted to a differential gear device 23 through a final drive gear set 22, and is further distributed from differential gear device 23 to right and left driving wheel.

The explanation of the drivelines of forward first-speed through sixth-speed in the transmission 50 has been discussed in the above. Herein, a driveline of a reverse selected condition will be discussed.

A reverse counter gear 24 is fixedly connected to idler shaft 3 so as to be integrally rotated with idler shaft 3. Reverse counter gear 24 is meshed with reverse input gear 7 mounted on input shaft 1. Further, a reverse idler gear 25 is rotatably provided around idler shaft 3 so as to be located near automatic clutch 4.

A fourth scynchromesh mechanism is provided on idler shaft 3 in the vicinity of reverse idler gear 25. When a coupling sleeve 27 of the fourth scynchromesh mechanism is slide from a neutral position in FIG. 1 toward the right-hand side, reverse idler gear 25 is integrally connected to idler shaft 3 so that the rotational power is transmitted thereby, and therefore a reverse selected condition is produced so that the rotation of input shaft 1 is transmitted from reverse input gear 7 through reverse counter gear 24, idler shaft 3, reverse idler gear 25 and reverse main gear 26 to output shaft 2.

Figure 3:
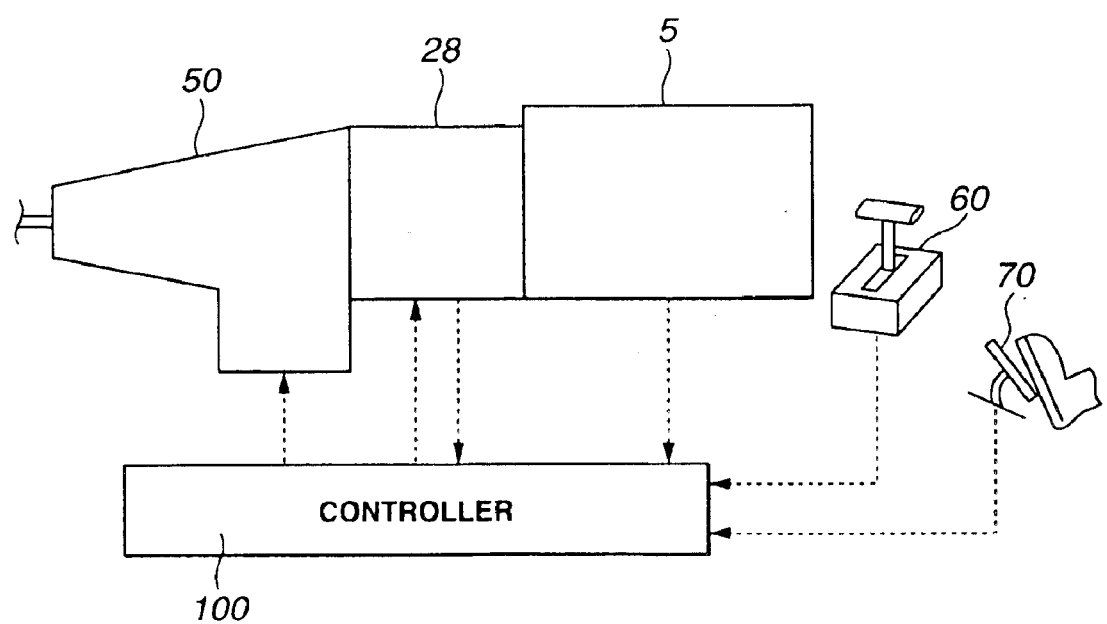
FIG. 3 is a schematic view showing a controller for controlling the transmission connected to an internal combustion engine and a generator/motor.

As shown in FIG. 3, a controller 100 is electronically connected to automatic-clutch type transmission 50, engine 5, motor/generator 28, a shift lever device 60 manipulated by a driver, and a brake switch 70 for detecting a driver's braking operation, so as to receive various information therefrom and to output a shift control signal to automatic-clutch type transmission 50. The various information includes a vehicle speed VSP, a throttle opening TVO detected from transmission 50 and engine 5, a select range selected at shift lever device 60 and a braking indicative signal detected from brake switch 70. That is, controller 100 constructs a shift control system of transmission 50.

A shifting operation of the automatic-clutch type transmission 50 is executed by the following manner: First, automatic clutch 4 is disengaged so that input shaft 1 is released from engine crankshaft 5a. Next, under this automatic-clutch disengaged condition, according to the desired transmission ratio, corresponding one of coupling sleeves 19, 20, 21 and 27 is automatically slid toward a corresponding direction so as to produce a desired transmission ratio. Then, automatic clutch 4 is engaged.

As shown in FIG. 1, motor/generator 28 is disposed between automatic clutch 4 and engine 5. An engine crankshaft 5a of engine 5 penetrates motor/generator 28 so as to be freely rotatable with respect to motor/generator 28. An assist input gear 29 is disposed between motor/generator 28 and automatic clutch 4. Assist input gear 29 is fixedly mounted on engine crankshaft 5a and is fixedly connected to a shaft 28a of motor/generator 28. That is, engine crankshaft 5a and shaft 28a of motor/generator 28 are connected with each other through assist input gear 29.

An assist output gear 30 is coaxially fixed to reverse idler gear 25. Assist input gear 29 and assist output 30 are parts of a bypass driveline 31 and function as input and output portions of bypass driveline 31. Reverse idler gear 25 is meshed with reverse main gear 26 fixedly connected to output shaft 2 so as to be capable of transmitting the rotational power from engine crankshaft 5a and shaft 28a of motor/generator 28 to output shaft 2. That is, bypass driveline 31 connects engine crankshaft 5a and shaft 28a of motor/generator 28 with output shaft 2 while bypassing automatic clutch 4.

Bypass driveline 31 comprises a bypass shaft 32 parallel with input and output shafts 1 and 2. Bypass shaft 32 is divided into first and second shaft portions 32a and 32b. A bypass clutch 33 of a wet-type multi-plate clutch is capable of detachably connecting first and second shaft portions 32a and 32b. A speed-change gear set 34 is provided between first shaft portion 32a and assist input gear 29. An assist counter gear 35 is fixedly mounted on second shaft portion 32b and is meshed with an assist intermediate gear 43 which is meshed with assist output gear 30.

Speed-change gear set 34 comprises an assist idler shaft 36 which is parallel with bypass shaft 32 and on which a low-speed assist gear 37 and a high-speed assist gear 38 are integrally mounted. Gears 39 and 40 are rotatably mounted around first shaft portion 32a. Gears 39 and 40 are meshed with low-speed assist gear 37 and high-speed assist gear 38, respectively. Further, a fifth synchromesh mechanism including a coupling sleeve 41 is provided on first shaft portion 32a.

When coupling sleeve 41 is slid from a neutral position of FIG. 1 toward the right-hand side and when bypass clutch 33 is put in the engaged state, gear 39 is fixedly connected to first shaft portion 32a. Therefore, the power transmitted from engine crankshaft 5a and motor/generator shaft 28a to assist input gear 29 and high-speed assist gear 38 is transmitted to output shaft 2 through low-speed assist gear 37, gear 39, first shaft portion 32a, bypass clutch 33, second shaft portion 32b, assist counter gear 35, assist intermediate gear 43, assist output gear 30, reverse idle gear 25 and reverse main gear 26. Under this bypass low-speed selected condition, an assist force of low-speed and high-torque is transmitted from engine crankshaft 5a and motor/generator shaft 28a through bypass driveline 31 to output shaft 2.

When coupling sleeve 41 is slid from a neutral position of FIG. 1 toward the left-hand side and when bypass clutch 33 is put in the engaged state, gear 40 is fixedly connected to first shaft portion 32a. Therefore, the power transmitted from engine crankshaft 5a and motor/generator shaft 28a to assist input shaft 29 is transmitted to output shaft 2 through high-speed assist gear 38, gear 40, first shaft portion 32a, bypass clutch 33, second shaft portion 32b, assist counter gear 35, assist intermediate gear 43, assist output gear 30, reverse idler gear 25 and reverse main gear 26. Under this bypass high-speed selected condition, an assist force of high-speed and low-torque is transmitted from engine crankshaft 5a and motor/generator shaft 28a through bypass driveline 31 to output shaft 2.

Figure 4:
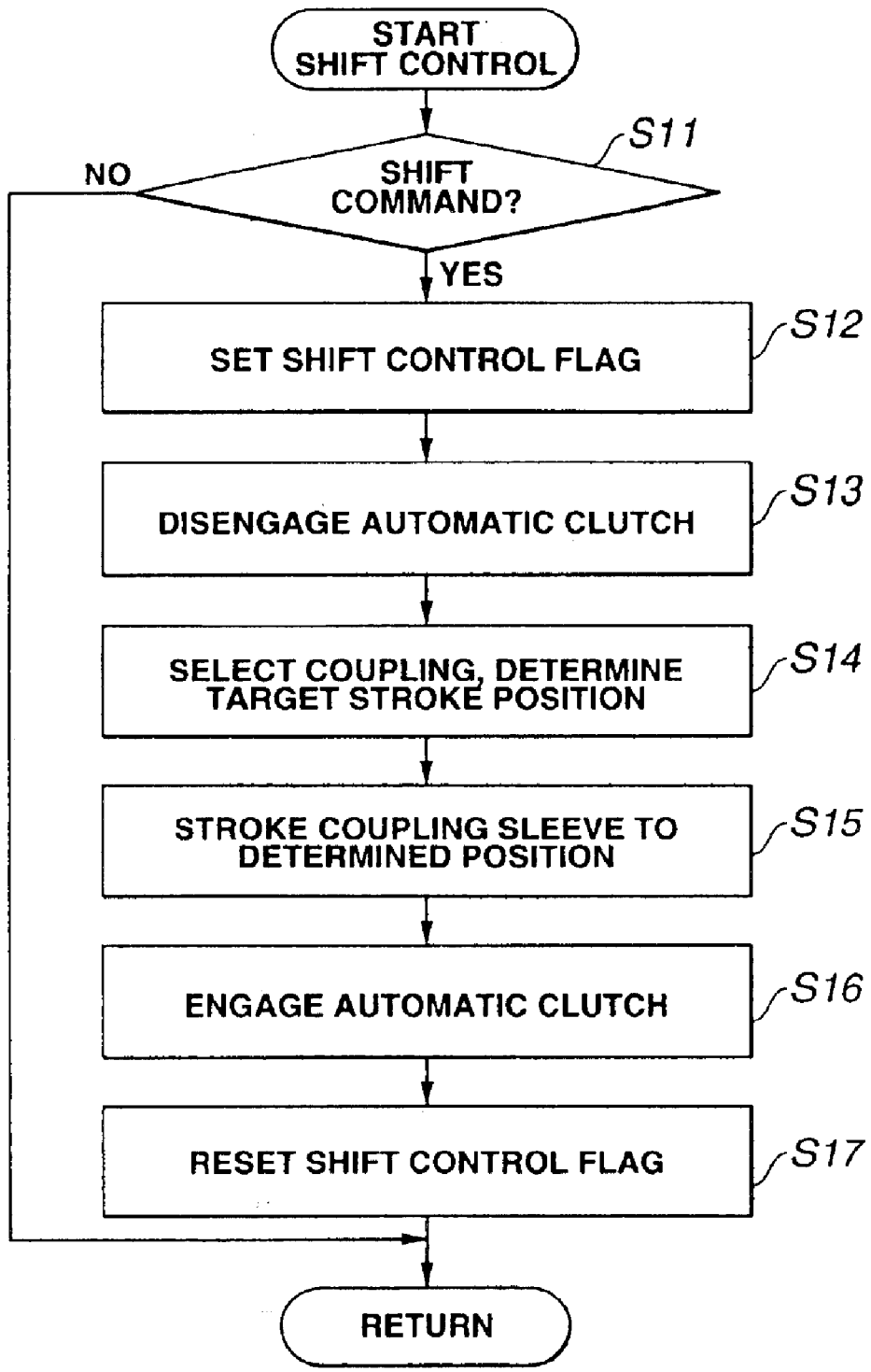
FIG. 4 is a flowchart showing a shaft control program executed by the controller of the transmission.

The shift control system of the above-discussed automatic clutch type transmission 50 executes a shift control on the basis of a flowchart of FIG. 4. Further, during this shift control, an assist control for applying an assist power to output shaft 2 is executed on the basis of a flowchart of FIG. 5.

The shift control will be discussed hereinafter with reference to the flowchart of FIG. 4.

At step S11, controller 100 determines whether or not a shift command is generated. More specifically, controller 100 calculates an optimum transmission-ratio position from a select range according to a traveling state (including a parking position state, reverse position selected through shift lever device 60 by the driver, vehicle speed VSP, throttle opening TVO on the basis of a predetermined shift map. When the optimum transmission-ratio position corresponds to a present transmission-ratio position, controller 100 outputs no shift command. When the optimum transmission-ratio position is different from the present transmission-ratio position, controller 100 outputs the shift command. Accordingly, when the determination at step S11 is affirmative, the routine proceeds to step S12. When the determination at step S11 is negative, the routine jumps to a return step.

At step S12, controller 100 sets a shift control flag indicative that the shift control is being executed.

At step S13, controller 100 commands the transmission 50 to set automatic clutch 4 at a disengaged state so as to put transmission 50 in a shift operation enabling state.

At step S14, controller 100 selects one of coupling sleeves 19, 20, 21 and 27 in response to the shift command and determines a target stroke of the selected coupling sleeve in response to the shift command.

At step S15, controller 100 commands the transmission 50 to stroke the selected one of coupling sleeves 19, 20, 21, and 27 at the determined position, and to set the other coupling sleeves (19, 20, 21, 27) at neutral position so as to establish the selected shift-position according to the shift command.

At step S16, controller 100 commands the transmission 50 to set automatic clutch at an engaged state.

At step S17, controller 100 resets the shift control flag. Then, the routine proceeds to the return step.

Subsequently, there will be discussed the assist control, which is executed during the shifting control, with reference to the flowchart of FIG. 5.

At step S21, controller 100 detects engine speed Ne and vehicle speed VSP and estimates an engine torque Te on the basis of this engine operational information and the engine data previously stored in the storage section of controller 100.

At step S22, controller 100 determines whether or not the shift control is being executed. That is, controller 100 checks the shift control flag. When the determination at step S22 is negative, that is, when the shift control is not being executed, the routine proceeds to step S23 wherein controller 100 determines whether or not engine 5 is put in an engine starting period. When the determination at step S23 is negative, the routine proceeds to step S24. When the determination at step S23 is affirmative, the routine proceeds to step S26.

At step S24 subsequent to the negative determination at step S23, controller 100 determines whether or not the vehicle now starts running. When the determination at step S24 is negative, the routine proceeds to step S25. When the determination at step S24 is affirmative, the routine proceeds to step S27.

At step S25 subsequent to the negative determination at step S25, controller 100 determines whether or not the braking operation is being executed. When the determination at step S25 is negative the routine proceeds to step S29. When the determination at step S25 is affirmative, the routine proceeds to step S28.

When the determination at step S23 is affirmative, that is, when controller 100 determines that the engine 5 is put in the engine starting period, the routine proceeds to step S26 wherein controller 100 controls motor/generator 28 as a starter motor for starting the engine 5.

When the determination at step S24 is affirmative, that is, when controller 100 determines that the vehicle is put in the running start period, the routine proceeds to step S27 wherein controller 100 controls generator/motor as a torque assist motor to improve the start acceleration of the vehicle.

When the determination at step S25 is affirmative, that is, when controller 100 determines that the braking operation is now executed, the routine proceeds to step S28 wherein controller 100 controls generator/motor as a regenerative brake so as to recover the kinetic energy of the vehicle as electric current to an energy storage device.

After the execution of step S26, S27 or S28 or the negative determination at step S25, the routine proceeds to step S29 wherein controller 100 commands transmission 50 to disengage bypass clutch 33. That is, when the shift operation is not executed, bypass clutch 33 is set at the disengaged state. Then, the routine proceeds to a return block.

On the other hand, when the determination at step S22 is affirmative, that is, when the shift control is now being executed, the routine proceeds from step S22 to step S31 wherein controller 100 calculates a target driving force $T_T$ of driving wheels from engine speed Ne and vehicle speed VSP.

This target driving force $T_T$ is determined such that even under a condition that automatic clutch 4 is disengaged during the shift control, the torque of output shaft 2 is maintained at a torque value when automatic clutch 4 is engaged.

At step S32 subsequent to the execution of step S31, controller 100 determines whether or not the target driving force $T_T$ is greater than the estimated engine torque Te. That is, controller 100 determines whether the target driving force $T_F$ is generated only by engine 5. When the determination at step S32 is affirmative, that is, when target driving force $T_T$ cannot be ensured only by engine 5, the routine proceeds to step S33 wherein controller 100 commands motor/generator 28 to generate a supplemental torque which is a difference between the target driving force $F_T$ and the estimated engine torque Te. Further, controller 100 commands transmission 50 to set speed-change gear set 34 at a low-speed position. When the determination at step S32 is negative, that is, when target driving force $T_T$ can be ensured only by engine 5, the routine jumps to step S34 without operating motor/generator 28 as a motor.

At step S34, controller 100 calculates a target engagement force of bypass clutch 33, from a ratio between target driving force $T_T$ and a sum of the estimate engine torque Te and the output torque of motor/generator 28. Controller 100 controls bypass clutch 33 so that the target engagement force of bypass clutch 33 is achieved after the hydraulic pressure of bypass clutch 33 is determined. Then, the routine proceeds to the return step.

With the thus arranged system of this embodiment according to the present invention, when automatic clutch 4 is disengaged during the shift control, the assist power is applied to output shaft 2 from the power source including engine 5 and motor/generator 28 through bypass driveline 31 while bypassing the automatic clutch 4. Accordingly, even if automatic clutch 4 is disengaged for the purpose of executing the shift operation, the driving force is continuously transmitted to output shaft 2. This solves a problem that a shift shock is generated by an interruption of the driving force so as to degrade the shift feeling.

Further, since such power assist to output shaft 2 during the shift operation under the automatic clutch disengaged state is executed through the bypass driveline 31 parallel to automatic clutch 4, the assist by motor 28 becomes non-essential. Accordingly, it becomes possible to solve the problem that in a case that this assist is realized only by motor, it is necessary that the motor has a performance of high-torque and high-power so as to sufficiently work in whole range from the low-speed position to the high-speed position. This prevents the transmission 50 from increasing in weight and cost and from degrading the installation ability.

Since this assist by power source 5 and 28 is executed by the bypass driveline 31, this assist force never affects the shift operation of the automatic clutch type transmission 50.

Further, in this embodiment, the power source is constituted by engine 5 and motor/generator 28, and shafts 5a and 28a of engine 5 and motor/generator 28 are connected with each other. Accordingly, only when the estimated engine torque Te is smaller than the target driving force $T_T$, the shortage of the torque is applied by operating motor/generator 28. Therefore, even when motor/generator 28 is employed for this assisting operation, the needed assist force is not large, and therefore it is not necessary to prepare a high-torque and high-power motor. This prevents the vehicle from becoming heavy in weight and high in cost and from degrading the installation ability.

Figure 5:
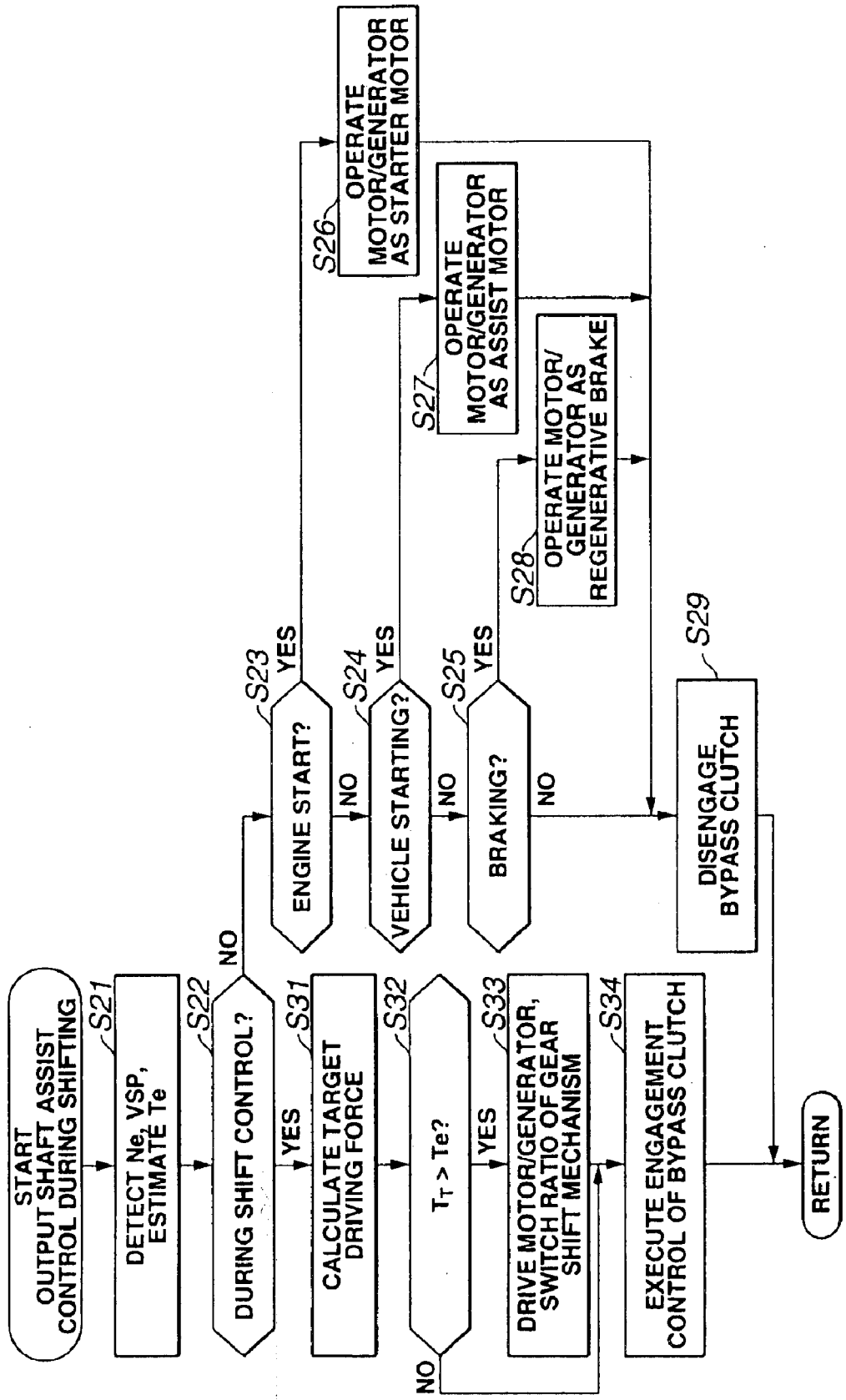
FIG. 5 is a flowchart showing an assist control executed by the controller during shifting.

Since motor/generator 28 is employed so as to be capable of working as an engine starter motor as discussed at step S26 in FIG. 5, it is possible to omit a starter motor. This enables the weight and the cost of the system to be decreased. Further, since motor/generator 28 is employed so as to be capable of working as a torque assist motor during a vehicle running start period as discussed at step S27 in FIG. 5, the power of engine 5 and the power of motor/generator 28 are combined and supplied to input shaft 1 through automatic clutch 4. Therefore, the vehicle run-starting performance is improved.

Furthermore, since motor/generator 28 is employed so as to be capable of working as a regenerative brake during the vehicle deceleration under a stationary automatic-clutch engaged state as discussed at step S28 in FIG. 5, it becomes possible to recover the vehicle kinetic energy during the deceleration. This improves the fuel consumption of the vehicle.

Additionally, the bypass driveline 31 is constructed by bypass clutch 32 and speed-change gear set 34, and bypass clutch 33 is engaged only when automatic clutch 4 is being disengaged for the shift operation. Therefore, the system according to the present invention can ensure the following advantages:

By the provision of bypass clutch 33, it is possible to firmly prevent the power transmission from the power source 5 and 28 through bypass driveline 31 to output shaft 2 when the vehicle is put in the ordinary state except for the shift operation or during the reverse selected state.

Further, by the provision of speed-change gear set 34, it becomes possible to properly apply the assist force to output shaft 3 through the whole range from the low-speed to the high-speed. Furthermore, this prevents the excessive rotation of the power source (engine 5 and motor/generator 28) during the assist control, and prevents lacing of the engine and the excessive degradation of motor.

Although the embodiment according to the present invention has been shown and described such that the automatic clutch type transmission 50 is of a parallel axis type, it will be understood that the invention is not limited to this and may be adapted to the other transmission such as a transmission employing a planetary gear set and the like. Even if the invention is applied to such a different transmission, the same advantages will be ensured by the same manner as discussed above.

This application is based on Japanese Patent Applications No. 2001-290580 filed on Sep. 25, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A power transmission system for a vehicle, comprising:
a power source generating a driving force of the vehicle the power source comprising an internal combustion engine and a motor/generator; and
a transmission comprising:
a transmission input shaft,
an input gear set attached to the transmission input shaft,
a transmission output shaft,
an output gear set attached to the transmission output shaft,
a plurality of coupling sleeves one of which selectively fixes one gear of the input gear set and the output gear set to one of the transmission input shaft and the transmission output shaft so as to establish a desired transmission ratio between the transmission input shaft and the transmission output shaft,
an automatic clutch that is selectively put in one of an engaged state for connecting the transmission input shaft with an output shaft of the power source and a disengaged state for disconnecting the transmission input shaft from the output shaft of the power source to execute a shift operation of the transmission, and
a bypass driveline that transmits a power of the power source to the transmission output shaft while bypassing the automatic clutch when the automatic clutch is put in the disengaged state.

2. The power transmission system as claimed in claim 1, wherein the bypass driveline comprises a bypass clutch which is selectively put in one of a disengaged state for disengaging the bypass driveline from the power source and an engaged state for engaging the bypass driveline with the power source, the bypass clutch being engaged only when the automatic clutch is disengaged.

3. The power transmission system as claimed in claim 1, wherein when a reverse shift position is selected, the power of the power source is transmitted through the transmission input shaft and an idler shaft to the transmission output shaft.

4. The power transmission system as claimed in claim 1, wherein the internal combustion engine and the motor/generator are arranged in series.

5. The power transmission system as claimed in claim 1, wherein an output shaft of the engine is connected to an output shaft of the motor/generator, the motor/generator being operated when the engine torque transmitted through the bypass driveline is smaller than a target driving force.

6. The power transmission system as claimed in claim 5, wherein the motor/generator is used as a starter motor when the engine is started.

7. The power transmission system as claimed in claim 5, wherein the motor/generator is used as an assist motor when a vehicle is started so that the power of the engine and the power of the motor/generator are transmitted to the automatic clutch.

8. The power transmission system as claimed in claim 5, wherein the motor/generator is capable of functioning as a generator, the motor/generator functioning as a regenerative brake when the vehicle is decelerated under a stationary state in which the automatic clutch is engaged.

9. A transmission comprising:
a transmission input shaft;
an input gear set attached to the transmission input shaft;
a transmission output shaft;
an output gear set attached to the transmission output shaft;
a plurality of coupling sleeves one of which selectively fixes one gear of the input gear set and the output gear set to one of the transmission input shaft and the transmission output shaft so as to establish a desired transmission ratio between the transmission input shaft and the transmission output shaft;
an automatic clutch that is selectively put in one of an engaged state for connecting the transmission input shaft with an output shaft of a power source and an disengaged state for disconnecting the transmission input shaft from the output shaft of the power source to execute a shift operation of the transmission; and
a bypass driveline that transmits a power of the power source to the transmission output shaft while bypassing the automatic clutch when the automatic clutch is put in the disengaged state to execute a shift operation,
wherein the bypass driveline comprises a bypass clutch which is selectively put in one of a disengaged state for disengaging the bypass driveline from the power source and an engaged state for engaging the bypass driveline with the power source, the bypass clutch being engaged only when the automatic clutch is disengaged,
wherein the bypass drive line comprises a speed-change gear set which is disposed between the output shaft of the power source and the bypass clutch, the speed-change gear set being selectively put in one of a high-speed gear ratio and a low-speed gear ratio.

10. A shift control system comprising:
a power source generating a driving force of the vehicle, the power source comprising an internal combustion engine and a motor/generator;
a transmission comprising:
a transmission input shaft,
an input gear set attached to the transmission input shaft,
a transmission output shaft parallel with the transmission input shaft,
an output gear set attached to the transmission output shaft, the output gear set being selectively engaged with the input gear set,
a coupling mechanism set that selectively fix one gear of the input gear set and the output gear set to one of the transmission input shaft and the transmission output shaft in response to a shift control signal,
an automatic clutch that is selectively put in one of an engaged state for connecting the transmission input shaft with an output shaft of the power source and an disengaged state for disconnecting the transmission input shaft from the output shaft of the power source,
a bypass power-transmission line selectively put in a connecting state for transmitting a power of the power source to the transmission output shaft through the bypass power-transmission line while bypassing the automatic clutch and a disconnecting state for canceling the power of the power source to the transmission output shaft through the bypass power-transmission line; and
a controller outputting the shift control signal to the transmission to establish a desired transmission ratio of the transmission, the controller putting the automatic clutch in the disengaged state during an operation of the coupling mechanism set, the controller putting the bypass power-transmission line in the connecting state during when the automatic clutch is put in the disengaged state.

* * * * *